US012424808B2

(12) United States Patent
Liao

(10) Patent No.: US 12,424,808 B2
(45) Date of Patent: Sep. 23, 2025

(54) CRIMPING PLIER

(71) Applicant: Hanlong Industrial Co., Ltd., New Taipei (TW)

(72) Inventor: Chien-Chou Liao, New Taipei (TW)

(73) Assignee: Hanlong Industrial Co., Ltd., New Taipei (TW)

( * ) Notice: Subject to any disclaimer, the term of this patent is extended or adjusted under 35 U.S.C. 154(b) by 661 days.

(21) Appl. No.: 17/852,537

(22) Filed: Jun. 29, 2022

(65) Prior Publication Data

US 2023/0318242 A1 Oct. 5, 2023

(30) Foreign Application Priority Data

Mar. 30, 2022 (TW) ................................. 111203211

(51) Int. Cl.

| | |
|---|---|
| ***H01R 43/042*** | (2006.01) |
| ***H01R 43/01*** | (2006.01) |
| *H01R 4/24* | (2018.01) |

(52) U.S. Cl.

CPC ......... *H01R 43/042* (2013.01); *H01R 43/015* (2013.01); *H01R 43/0421* (2013.01); *H01R 4/24* (2013.01); *Y10T 29/53226* (2015.01)

(58) Field of Classification Search

CPC ................ H01R 43/042; H01R 43/015; H01R 43/0421; H01R 43/0424; H01R 4/24; Y10T 29/53226; Y10T 29/53257

See application file for complete search history.

(56) References Cited

U.S. PATENT DOCUMENTS 3,375,697 A * 4/1968 Arnold ............... H01R 43/0421 72/402
2017/0294752 A1* 10/2017 Lin .................... H01R 43/0421

FOREIGN PATENT DOCUMENTS

JP 2018111193 A * 7/2018 ............... B25B 7/12

OTHER PUBLICATIONS

Muravlov et al, "Plastic Deformation of Crimp Sleeves of Electric Networks," 2021 IEEE International Conference on Modern Electrical and Energy Systems (MEES), Kremenchuk, Ukraine, 2021, pp. 1-6. (Year: 2021).*

* cited by examiner

*Primary Examiner* — A. Dexter Tugbang
(74) *Attorney, Agent, or Firm* — Best & Flanagan LLP

(57) ABSTRACT

A crimping plier includes a clamp handle mechanism, a crimping mechanism, and a driving mechanism. The clamp handle mechanism includes a first clamp handle and a second clamp handle pivoted to each other. The crimping mechanism includes a main body, a crimping tooth member and a crimping member. One end of the crimping tooth member has a tooth-shaped structure, and the tooth-shaped structure corresponds to a terminal accommodation portion of the main body. The crimping member has a flat end positioned in a first position or a second position. The driving mechanism includes a first connecting rod and a second connecting rod respectively connected to the first clamp handle and the second clamp handle. The first connecting rod and the second connecting rod are jointly connected to the crimping tooth member and the crimping member.

14 Claims, 15 Drawing Sheets

CRIMPING PLIER

BACKGROUND

1. Technical Field

The present disclosure relates to a crimping plier.

2. Description of the Related Art

With the development of communication technology, almost every household has Internet access. At present, most of the Internet access deployed at fixed areas (such as home environments or offices) is provided by wired means. That is, the signal is transmitted through a network cable laid by the telecommunication company, wherein the network cable needs to be electrically connected to an electronic device through a telecommunications connector (or a so-called network terminal).

Please refer to FIG. 1, which illustrates a schematic drawing showing a common type of telecommunications connector. As shown in FIG. 1, the telecommunications connector 9 comprises a connection terminal 91 and a signal cable 92. A common connection terminal 91 is made with a plastic housing, and the connection terminal 91 has a plurality of conductive contact pins 911 (or so-called gold plates) and a strain latch 912. The signal cable 92 comprises a plurality of twisted cores 921 with the outmost layer covered by an insulated cable jacket 922. The user arranges multiple cores 921 of the signal cable 92 in the front of the connection terminal 91 such that they respectively correspond to the conductive contact pins 911 of the connection terminal 91. The conventional crimping plier has a terminal accommodation portion and a tooth-shaped press member such that the user can place the connection terminal 91 within the terminal accommodation portion and crimp the conductive contact pins 911 and the cores 921 via the tooth-shaped press member. Moreover, the conventional crimping plier also has a flat press plate for crimping the strain latch 912 and the cable jacket 922 of the signal cable 92 and thereby securing the connection terminal 91 and the signal cable 92.

Please refer to FIG. 2A and FIG. 2B, which are schematic drawings showing another type of telecommunications connector. As shown in FIG. 2A and FIG. 2B, this type of telecommunications connector **9*a* not only has the abovementioned connection terminal 91 and signal cable 92 but also adopts a metal housing 93 in order to achieve a shielding effect. The metal housing 93 is sleeved onto the outer side of the connection terminal 91, and the metal housing 93 has two extension portions 931 which can wrap around the cable jacket 922 of the signal cable 92 (as shown in FIG. 2B) so as to secure the connection terminal 91 and the signal cable 92. The connection terminal 91 of the telecommunications connector 9*a* having the metal housing 93 does not have the structure of the strain latch 912. As a result, due to the structure of the flat press plate, the above conventional crimping plier is not applicable for this telecommunications connector 9*a*. In other words, the crimping plier only having the tooth-shaped press member (i.e., without the flat press plate) is applicable for the telecommunications connector 9*a* having the metal housing 93. Further, it is rather inconvenient to wrap the extension portions 931 around the cable jacket 922 of the signal cable 92** by means of other tools or even to do so manually.

SUMMARY

It is an object of the present disclosure to provide a crimping plier comprising a clamp handle mechanism, a crimping mechanism and a driving mechanism. According to the design that the crimping mechanism includes a crimping tooth member, a crimping member and a clamp set, the crimping member can be positioned in a first position or a second position so as to solve the problem that the conventional crimping plier cannot be applied to both a general telecommunications connector with only a plastic housing and a telecommunications connector with a metal housing.

To achieve the abovementioned object, the present disclosure provides a crimping plier, used for crimping a telecommunications connector. The crimping plier comprises a clamp handle mechanism, a crimping mechanism and a driving mechanism. The clamp handle mechanism comprises a first clamp handle and a second clamp handle pivoted to each other. The crimping mechanism comprises a main body, a crimping tooth member, a crimping member and a clamp set. The main body is disposed on a top end of the clamp handle mechanism. The main body has a terminal accommodation portion. The crimping tooth member can be movably disposed on the main body. One end of the crimping tooth member has a tooth-shaped structure. The tooth-shaped structure corresponds to the terminal accommodation portion. The crimping member can be movably disposed on the main body. The crimping member has a flat end. The flat end corresponds to the terminal accommodation portion, and the flat end is positioned in a first position or a second position. The clamp set includes a first concave portion and a second concave portion. The first concave portion is disposed on the first clamp handle, and the second concave portion is disposed on the second clamp handle. The driving mechanism is disposed between the first clamp handle and the second clamp handle. The driving mechanism comprises a first connecting rod and a second connecting rod. One end of the first connecting rod is connected to the first clamp handle, and the other end of the first connecting rod is connected to the crimping tooth member and the crimping member. One end of the second connecting rod is connected to the second clamp handle, and the other end of the second connecting rod is connected to the crimping tooth member and the crimping member. When the first clamp handle and the second clamp handle move toward each other, the first connecting rod and the second connecting rod push the crimping tooth member and the crimping member such that the tooth-shaped structure of the crimping tooth member enters into the terminal accommodation portion and the flat end of the crimping member selectively enters into the terminal accommodation portion, and the first concave portion and the second concave portion close to jointly form a circular structure.

According to one embodiment of the present disclosure, the main body comprises a first side face and a second side face opposite to each other. The crimping member is disposed on the first side face of the main body, and the crimping tooth member is disposed on the second side face of the main body.

According to one embodiment of the present disclosure, the driving mechanism further comprises a support block and at least one spring. The support block is connected to the first connecting rod and the second connecting rod. One end of the spring in connected to the main body, and the other end of the spring is connected to the support block. When the clamp handle mechanism receives a force, the first clamp handle and the second clamp handle move toward each other, and the first connecting rod and the second connecting rod push the support block to move toward the crimping mechanism and thereby compress the spring.

According to one embodiment of the present disclosure, when the clamp handle mechanism releases the force, the support block is propelled away from the crimping mechanism by an elastic three from the spring. Further, the support block drives the first connecting rod and the second connecting rod such that the first clamp handle and the second clamp handle move away from each other.

According to one embodiment of the present disclosure, the support block has a pivot portion. The first connecting rod, the second connecting rod, the crimping tooth member and the crimping member are connected to the pivot portion.

According to one embodiment of the present disclosure, when the flat end of the crimping member is positioned in the first position and the first clamp handle and the second clamp handle move toward each other, the flat end enters into the terminal accommodation portion; when the flat end of the crimping member is positioned in the second position and the first clamp handle and the second clamp handle move toward each other, the flat end is located outside of the terminal accommodation portion.

According to one embodiment of the present disclosure, the crimping member comprises a crimping block, a positioning plate and a positioning pillar. The flat end is located at the crimping block, the positioning pillar passes through the crimping block and is connected to the positioning plate, and the positioning plate is connected to the first connecting rod and the second connecting rod.

According to one embodiment of the present disclosure, the crimping block has a first positioning hole and a second positioning hole. The second positioning hole is located adjacent to the flat end. When the positioning pillar passes through the first positioning hole, the flat end is positioned in the first position; and when the positioning pillar passes through the second positioning hole, the flat end is positioned in the second position.

According to one embodiment of the present disclosure, the crimping mechanism further comprises a first blade disposed on the outside of the crimping tooth member. When the first clamp handle and the second clamp handle move toward each other, the first blade moves toward the terminal accommodation portion.

According to one embodiment of the present disclosure, the clamp handle mechanism further comprises a storage element disposed within the first clamp handle, and one end of the storage element is pivoted to the first clamp handle.

According to one embodiment of the present disclosure, the storage element comprises a storage groove. The storage element rotates relative to the first clamp handle such that the storage groove moves to the outside of the first clamp handle.

According to one embodiment of the present disclosure, the driving mechanism further comprises a ratchet and a stopper. The ratchet is disposed on the second clamp handle and has a protrusion. One end of the stopper is connected to the first clamp handle, the stopper has a plurality of tooth portions, and the protrusion engages with one of the tooth portions.

According to one embodiment of the present disclosure, when the first clamp handle and the second clamp handle move toward each other, the protrusion of the ratchet engages with another one of the tooth portions.

According to one embodiment of the present disclosure, the clamp handle mechanism further comprises a second blade disposed on the first clamp handle on one side facing the second clamp handle.

According to one embodiment of the present disclosure, the second clamp handle further comprises a concave groove and a wire cutting portion. The concave groove is adjacent to the wire cutting portion, and the second blade corresponds to the concave groove and the wire cutting portion.

As described above, the crimping plier of the present disclosure comprises a clamp handle mechanism, a crimping mechanism and a driving mechanism. The crimping mechanism includes a crimping tooth member, a crimping member and a clamp set. Further, a flat end of the crimping member can be positioned in a first position or a second position such that when a first clamp handle and a second clamp handle move toward each other, the flat end of the crimping member can selectively enter into a terminal accommodation portion so as to be applicable for different types of telecommunications connectors. More specifically, in the case of the flat end being positioned in the first position, when the first clamp handle and the second clamp handle move toward each other, the flat end of the crimping member can enter into the terminal accommodation portion so as to be applicable for a telecommunications connector having only a plastic housing. In the case of the flat end being positioned in the second position, the flat end of the crimping member is located outside of the terminal accommodation portion when the first clamp handle and the second clamp handle move toward each other so as to be applicable for a telecommunications connector having a metal housing. Moreover, the clamp set can be used to wrap the extension portions of the metal housing around the cable jacket of the signal cable.

DETAILED DESCRIPTION OF THE EMBODIMENTS

In order to make the structure, characteristics, and effectiveness of the present disclosure further understood and recognized, a detailed description of the present disclosure is provided as follows, along with embodiments and accompanying figures.

In the description of each embodiment, the term "first" or "second" is used for simply describing different elements, and these elements should not be limited by the terms. All terms related to directions or orientations mentioned in the following embodiments, such as up, down, left, right, front, back, above, under, in the left-hand (side), in the right-hand (side), in the front (side, end) or in the back (side, end), are just directions for referring to the figures. Therefore, all the terms related to directions or orientations are only used for explanation purposes and not for limiting the scope of the present disclosure. Further, for the convenience and clarity of description, the thickness or size of each element in the figures is illustrated in exaggerated, omitted or abstract ways for those skilled in the art to understand and read. The size of each element in the figures is not entirely its actual size and is not used as a limitation of the embodiments disclosed herein, so it does not construe any technically material meaning. Without affecting the results of efficiency achievement and object implementation of this disclosure, any retouch, ratio relationship change or size adjustment of the structure shall still fall within the scope of the technical content in this disclosure.

Figure 1:
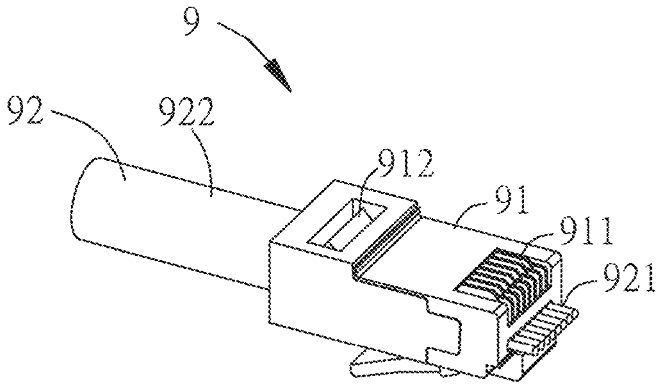
FIG. 1 (Prior Art)
FIG. 1 illustrates a schematic drawing showing a common type of telecommunications connector.
Figure 2A:
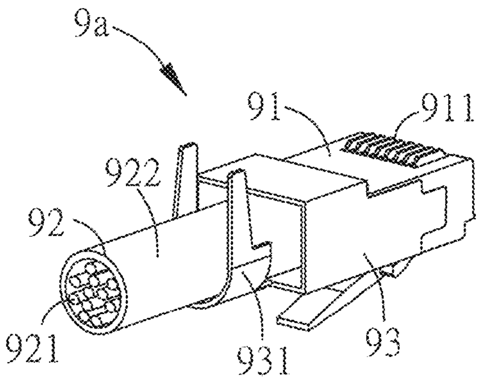
FIG. 2A (Prior Art)
FIG. 2A and FIG. 2B are schematic drawings showing another type of telecommunications connector.
Figure 3A:
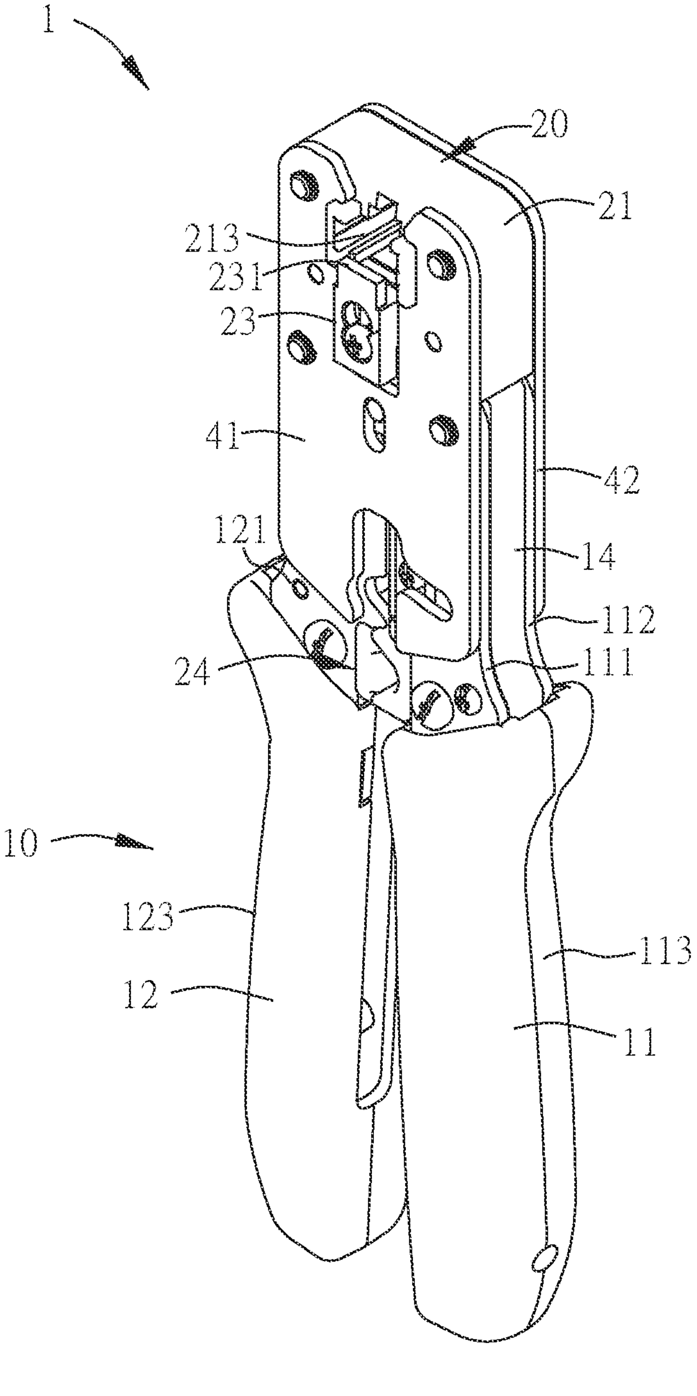
FIG. 3A illustrates a schematic drawing of a crimping plier according to one embodiment of the present disclosure.
Figure 3B:
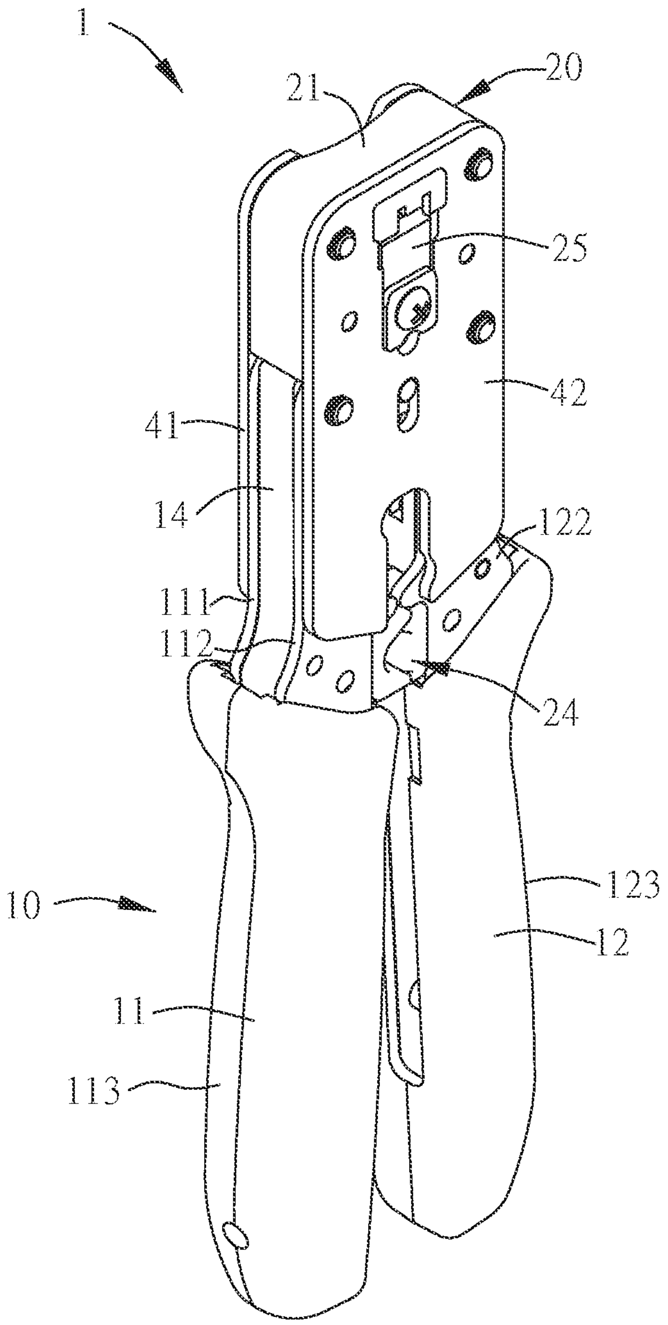
FIG. 3B illustrates a schematic drawing showing a back side of the crimping plier as shown in FIG. 3A.
Figure 4A:
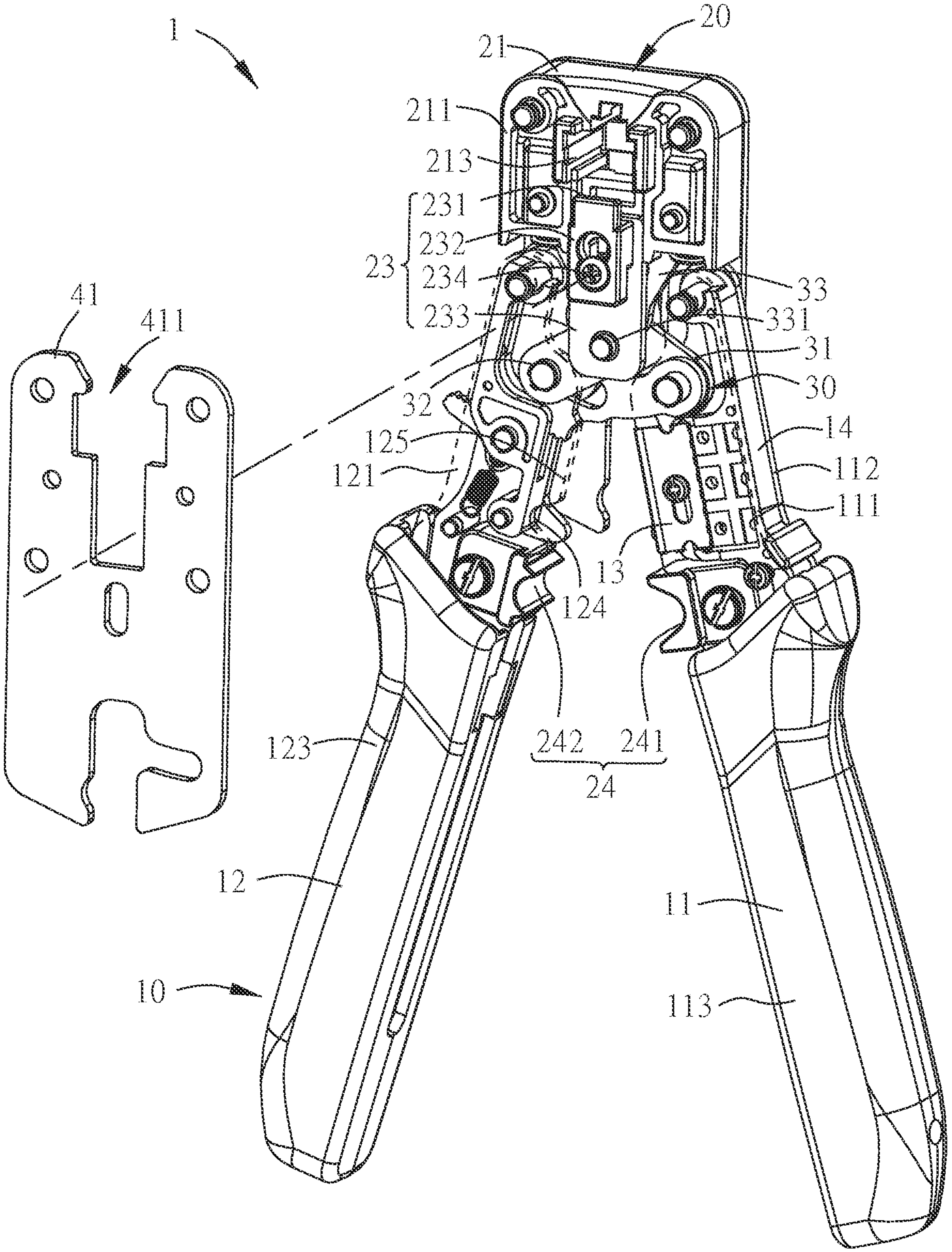
FIG. 4A illustrates a partially exploded view of the crimping plier as shown in FIG. 3A.
Figure 4B:
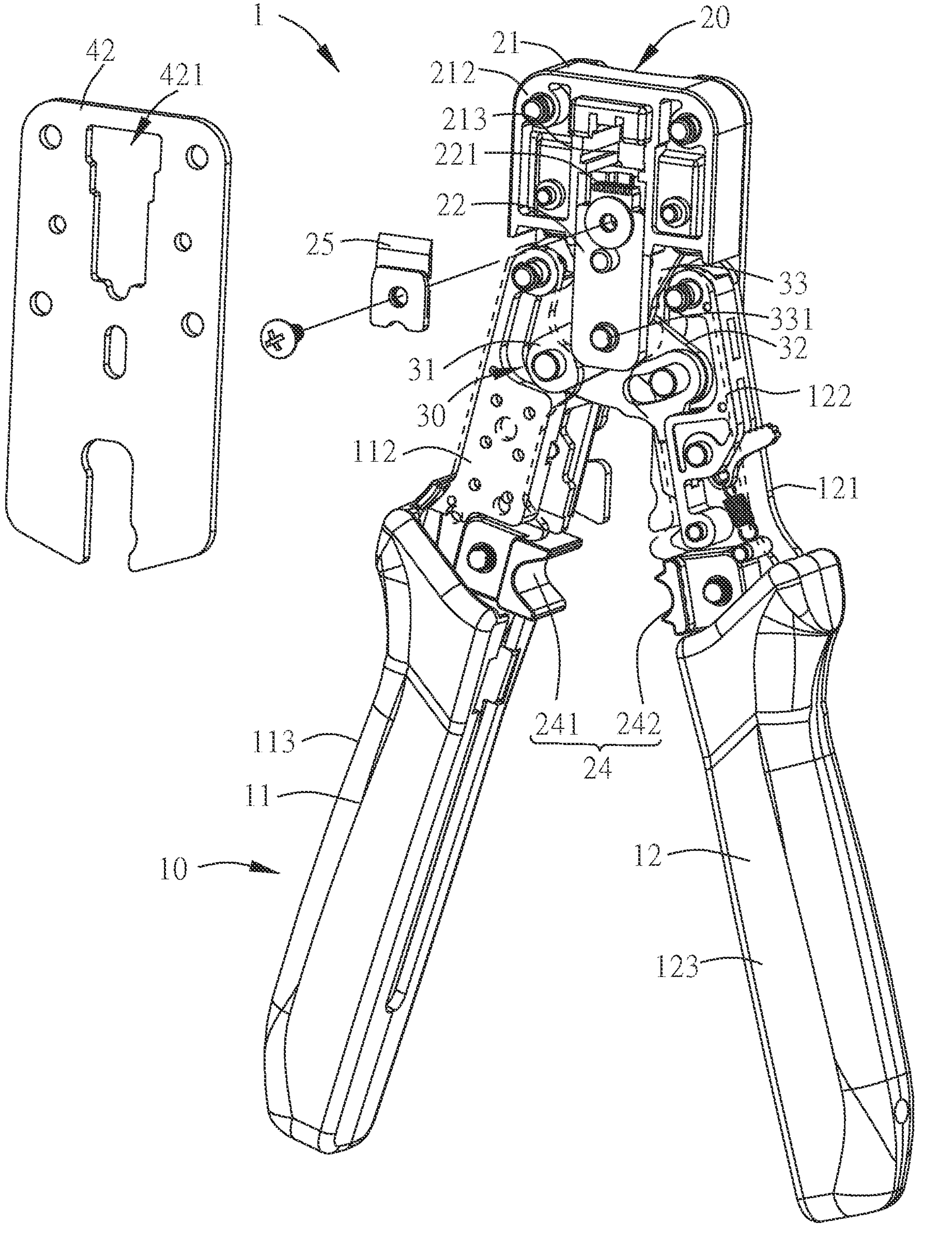
FIG. 4B illustrates a partially exploded view of the crimping plier as shown in FIG. 3B.
Figure 5A:
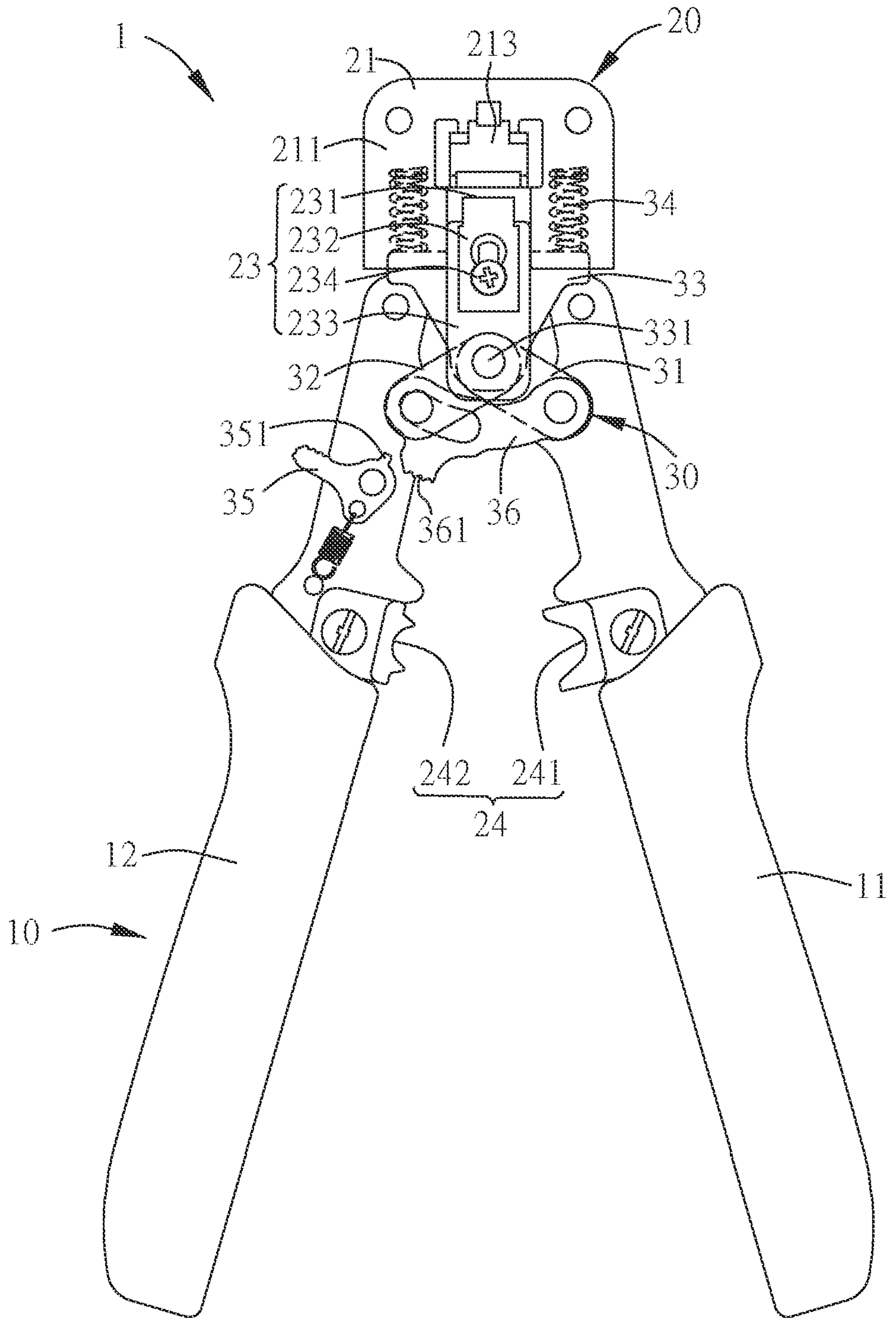
FIGS. 5A to 5C illustrate operation views of the crimping plier as shown in FIG. 4A.
Figure 5B:
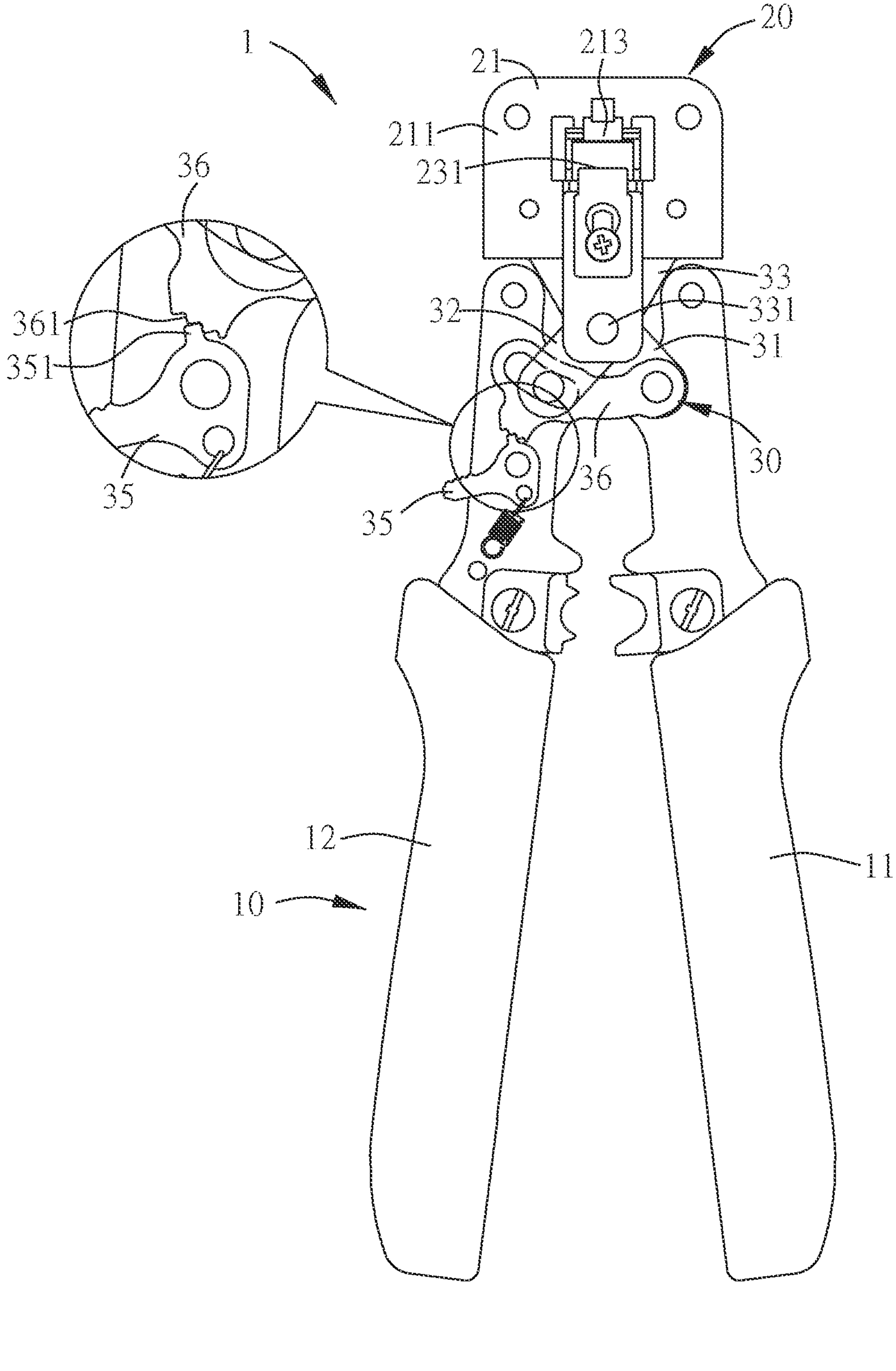
Figure 5C:
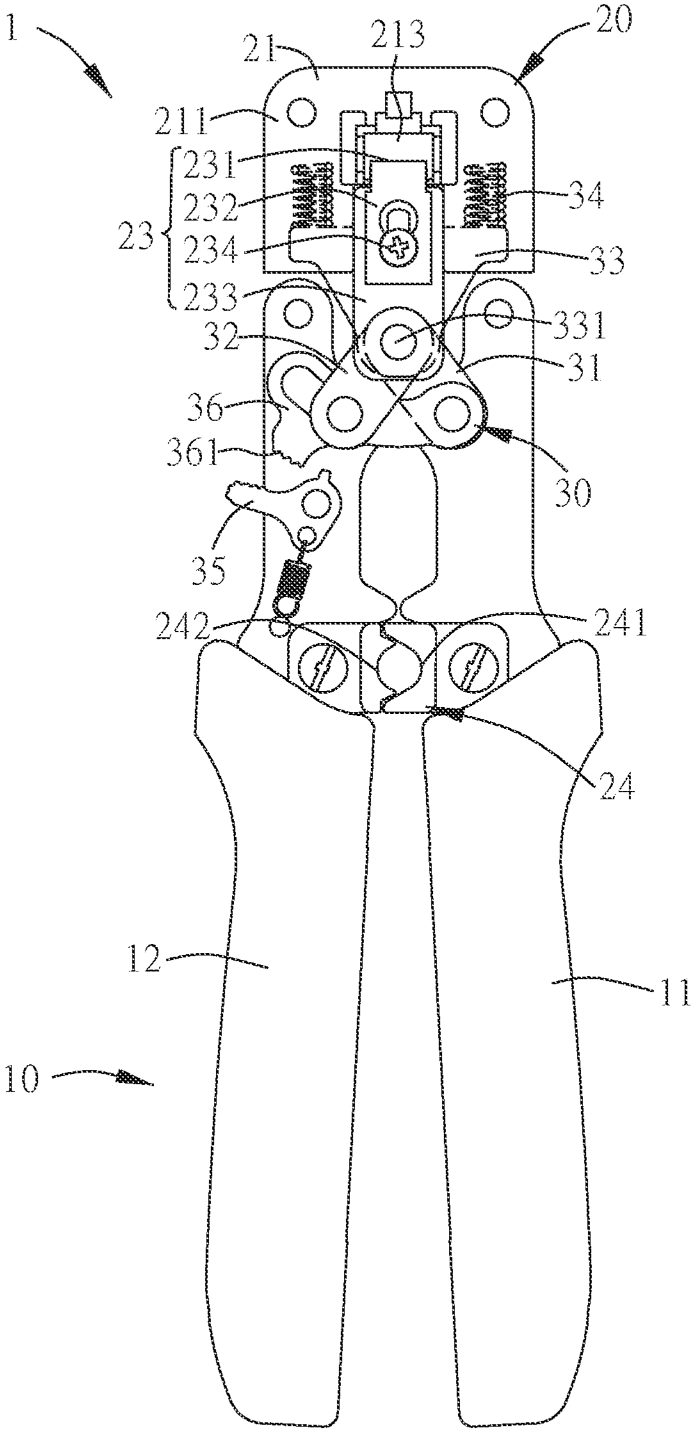

FIG. 3A illustrates a schematic drawing of a crimping plier according to one embodiment of the present disclosure; FIG. 3B illustrates a schematic drawing showing a back side of the crimping plier as shown in FIG. 3A; FIG. 4A illustrates a partially exploded view of the crimping plier as shown in FIG. 3A; FIG. 4B illustrates a partially exploded view of the crimping plier as shown in FIG. 3B; and FIGS. 5A to 5C illustrate operation views of the crimping plier as shown in FIG. 4A. Please refer to the abovementioned figures along with the following embodiments. First, the crimping plier 1 in this embodiment is used for crimping a telecommunications connector 9 or 9*a*. That is, the crimping plier 1 can be used for crimping two different types of telecommunications connectors, specifically, the telecommunications connector 9 as shown in FIG. 1 and the telecommunications connector 9*a* as shown in FIG. 2A. In this embodiment, the crimping plier 1 comprises a clamp handle mechanism 10, a crimping mechanism 20 and a driving mechanism 30. The clamp handle mechanism 10 comprises a first clamp handle 11 and a second clamp handle 12 pivoted to each other such that the crimping plier 1 can be in either an open state or a closed state. In this embodiment, the first clamp handle 11 includes a front plate body 111, a back plate body 112 and a handle 113. Further, the front plate body 111 and the back plate body 112 are disposed within the handle 113 such that a space is fined between the front plate body 111 and the back plate body 112. Similarly, the second clamp handle 12 includes a front plate body 121, a back plate body 122 and a handle 123. The front plate body 121 and the back plate body 122 are disposed within the handle 123 such that a space is formed between the front plate body 121 and the back plate body 122. In this embodiment, the crimping mechanism 20 and the driving mechanism 30 are disposed between the first clamp handle 11 and the second clamp handle 12 and are located above the handles 113 and 123. It is to be noted that the front plate body 111 and the front plate body 121 shown in FIG. 4A are depicted in dashed lines, and the back plate body 112 and the back plate body 122 shown in FIG. 4B are also depicted in dashed lines.

In this embodiment, the crimping mechanism 20 includes a main body 21, a crimping tooth member 22 (as shown in FIG. 4B), a crimping member 23 and a clamp set 24. The main body 21 is disposed on a top end of the clamp handle mechanism 10. That is, the main body 21 is located adjacent to one end which is away from the handles 113 and 123. Further, the main body 21 comprises a first side face 211 (as shown in FIG. 4A) and a second side face 212 (as shown in FIG. 4B) opposite to each other, and a terminal accommodation portion 213. The first side face 211 is the face adjacent to the front plate bodies 111 and 121, while the second side face 212 is the face adjacent to the back plate bodies 112 and 122. The terminal accommodation portion 213 is a groove body for accommodating the connection terminal 91. The terminal accommodation portion 213 transverses across the main body 21 such that two relative openings of the terminal accommodation portion 213 are respectively located on the first side face 211 and the second side face 212.

Preferably, the crimping plier 1 of this embodiment further comprises a first side plate 41 and a second side plate 42. The first side plate 41 is disposed on the outside of the first side face 211 of the main body 21, while the second side plate 42 is disposed on the outside of the second side face 212. In other words, the main body 21 is disposed between the first side plate 41 and the second side plate 42 such that the crimping plier 1 will have a simple appearance. As shown in FIG. 4A and FIG. 4B, correspondingly, the first side plate 41 has an opening 411 and the second side plater 42 has an opening 421 which correspond to the terminal accommodation portion 213.

In this embodiment, the crimping tooth member 22 and the crimping member 23 can be movably disposed within the main body 21. More specifically, the crimping tooth member 22 and the crimping member 23 can be driven by the driving mechanism 30 such that they move upward or downward within the main body, and details of these movements will be described hereinafter. Preferably, the crimping member 23 is disposed on the first side face 211 of the main body 21 as shown in FIG. 4A, and the crimping tooth member 22 is disposed on the second side face 212 of the main body 21 as shown in FIG. 4B. Because the terminal accommodation portion 213 transverses across the main body 21, two relative ends of the terminal accommodation portion 213 can respectively correspond to the crimping tooth member 22 and the crimping member 23. As shown in FIG. 4B, one end of the crimping tooth member 22 has a tooth-shaped structure 221, and the tooth-shaped structure 221 corresponds to the terminal accommodation portion 213 on one end located at the second side face 212. As shown in FIG. 4A and FIG. 5A, the crimping member 23 has a flat end 231, and the flat end 231 corresponds to the terminal accommodation portion 213 on one end adjacent to the first side face 211. That is, the tooth-shaped structure 221 and the flat end 231 respectively face toward two relative ends of the terminal accommodation portion 213. When the user places the connection terminal 91 into the terminal accommodation portion 213, the conductive contact pins 911 will correspond to the tooth-shaped structure 221.

Please refer to FIG. 4A, FIG. 4B and FIG. 5A. The driving mechanism 30 includes a first connecting rod 31 and a second connecting rod 32 located under the crimping mechanism 20. One end of the first connecting rod 22 is connected to the first clamp handle 11, and the other end of the first connecting rod 22 is connected to the crimping tooth member 22 and the crimping member 23. Similarly, one end of the second connecting rod 32 is connected to the second clamp handle 12, and the other end of the second connecting rod 32 is connected to the crimping tooth member 22 and the crimping member 23. Therefore, when the user applies a force to the first clamp handle 11 and the second clamp handle 12 to cause the first clamp handle 11 and the second clamp handle 12 to move toward each other (see the operation views depicted from FIG. 5A to FIG. 5C), the first connecting rod 31 and the second connecting rod 32 will move upward to push the crimping tooth member 22 and the crimping member 23 such that the tooth-shaped structure 221 (shown in FIG. 4B) of the crimping tooth member 22 will enter into the terminal accommodation portion 213, and the flat end 231 of the crimping member 23 can selectively enter into the terminal accommodation portion 213. Other structures of the driving mechanism 30 it be further described below, and the details of how the flat end 231 selectively enters into the terminal accommodation portion 213 will be described further later.

Preferably, the driving mechanism 30 in this embodiment further comprises a support block 33. The support block 33 is located above the first connecting rod 31 and the second connecting rod 32. The support block 33 is connected to the first connecting rod 31, the second connecting rod 32, the crimping tooth member 22 and the crimping member 23. Specifically, the support block 33 has a pivot portion 331, wherein the first connecting rod 31, the second connecting rod 32, the crimping tooth member 22 and the crimping member 23 are connected to the pivot portion 331. According to the arrangement of the pivot portion 331, the first connecting rod 31 and the second connecting rod 32 can smoothly convert the force coming from the left side or the right side into an upward three. Further, the first connecting rod 31 and the second connecting rod 32 can also jointly apply the upward three to the crimping tooth member 22 and the crimping member 23 through the pivot portion 331 so as to avoid dispersion of force.

Preferably, the driving mechanism 30 further comprises at least one spring 34, as shown in FIG. 5A and FIG. 5C. The driving mechanism 30 in this embodiment comprises two springs 34 respectively disposed on a left end and a right end above the support block 3. One end of the spring 34 is connected to the main body 21, and the other end of the spring 34 is connected to the support block 33. Specifically, the main body 21 has a slot (not shown in figures) for placing the spring 34 so that the spring 34 can be placed within the slot such that one end of the spring 34 is connected to the main body 21. Further, part of the support block 33 can also be placed within the slot such that the other end of the spring 34 is connected to the support block 33. When the clamp handle mechanism 10 receives a force such that the first clamp handle 11 and the second clamp handle 12 move toward each other (see the operation views depicted from FIG. 5A to FIG. 5C), the first connecting rod 31 and the second connecting rod 32 will push the support block 33 toward the crimping mechanism 20 and compress the spring 34. Therefore, when the clamp handle mechanism 10 releases the force (i.e., the user releases the clamp handle mechanism 10), the support block 33 will be propelled by an elastic force from the spring 34 such that it moves away from the crimping mechanism 20. Meanwhile, the support block 33 will drive the first connecting rod 31 and the second connecting rod 32 such that the first clamp handle 11 and the second clamp handle 12 will move away from each other; i.e., such operations can be seen from FIG. 5C to FIG. 5A. In other words, according to the arrangement of the support block 33 and the spring 34, the clamp handle mechanism 10 can automatically return to its original position when the force is released so as to improve the convenience of operation for the user.

Please refer to FIG. 5A to FIG. 5C; preferably, the driving mechanism 30 further comprises a ratchet 35 and a stopper 36. The ratchet 35 is disposed on the second clamp handle 12, and one end of the stopper 36 is connected to the first clamp handle 11. Therefore, the ratchet 35 and the stopper 36 can also move toward or away from each other along with the operations of the first clamp handle 11 and the second clamp handle 12. As shown in FIG. 5B, the ratchet 35 has a protrusion 351, and the stopper 36 has a plurality of tooth portions 361. When the first clamp handle 11 and the second clamp handle 12 move toward each other and reach a certain distance (as shown in FIG. 5B), the protrusion 351 engages with one of the tooth portions 361. At this time, even if the user stops applying the fierce, the engagement between the protrusion 351 and the tooth portion 361 will secure the relative positions of the first clamp handle 11 and the second clamp handle 12; therefore, the distance between the first clamp handle 11 and the second clamp handle 12 will remain the same. Furthermore, if the first clamp handle 11 and the second clamp handle 12 move even closer to each other, the protrusion 351 of the ratchet 35 will engage with another one of the tooth portions 361. As a result, along with the operations of the first clamp handle 11 and the second clamp handle 12 moving toward each other, the protrusion 351 can move from one tooth portion 361 to another tooth portion 361 such that the user can apply the force step by step, thereby achieving an effort-saving effect.

Figure 6A:
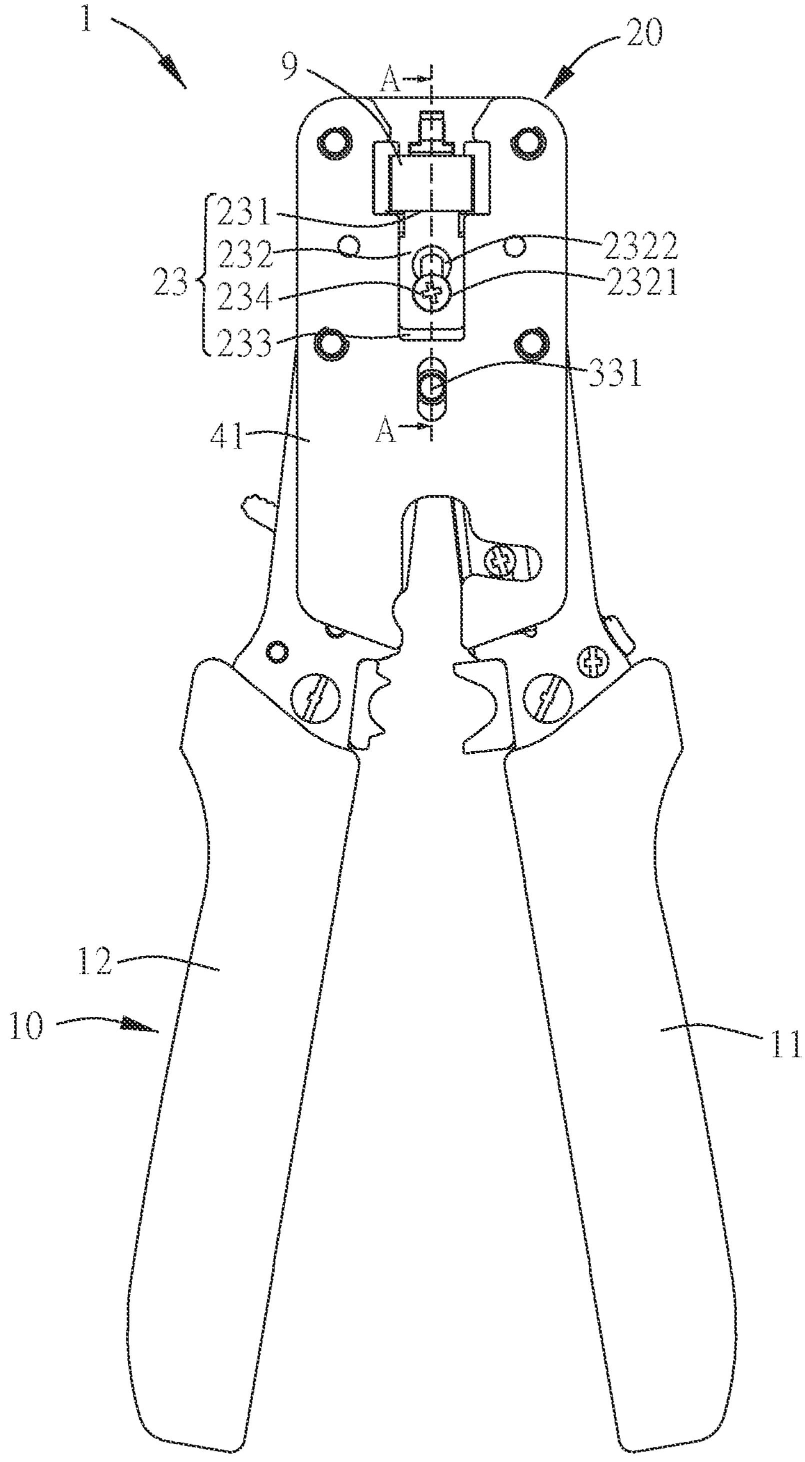
FIG. 6A illustrates a schematic drawing depicting the crimping plier as shown in FIG. 3A being used for crimping a telecommunications connector as shown in FIG. 1.
Figure 6B:
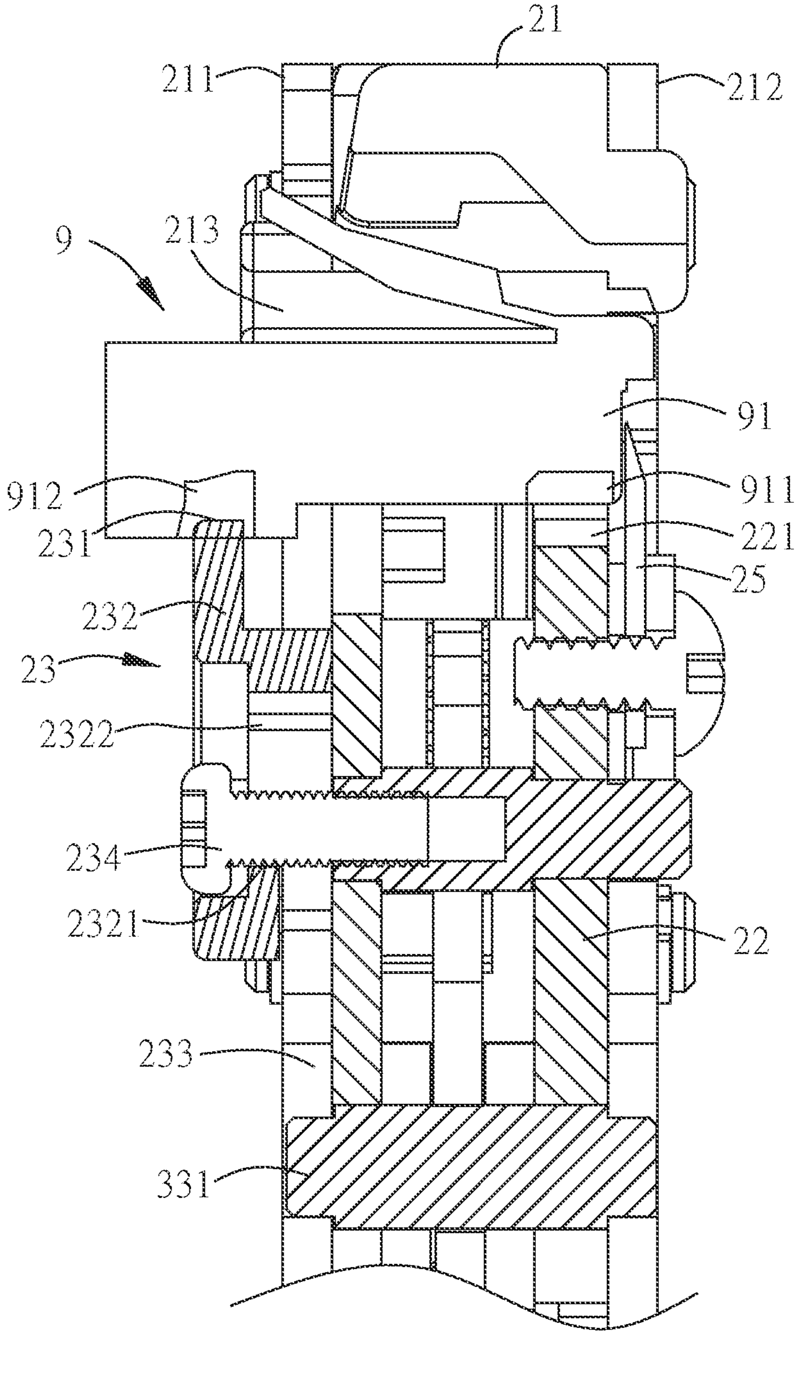
FIG. 6B illustrates a cross-sectional view of the crimping plier along the A-A side of FIG. 6A.
Figure 7A:
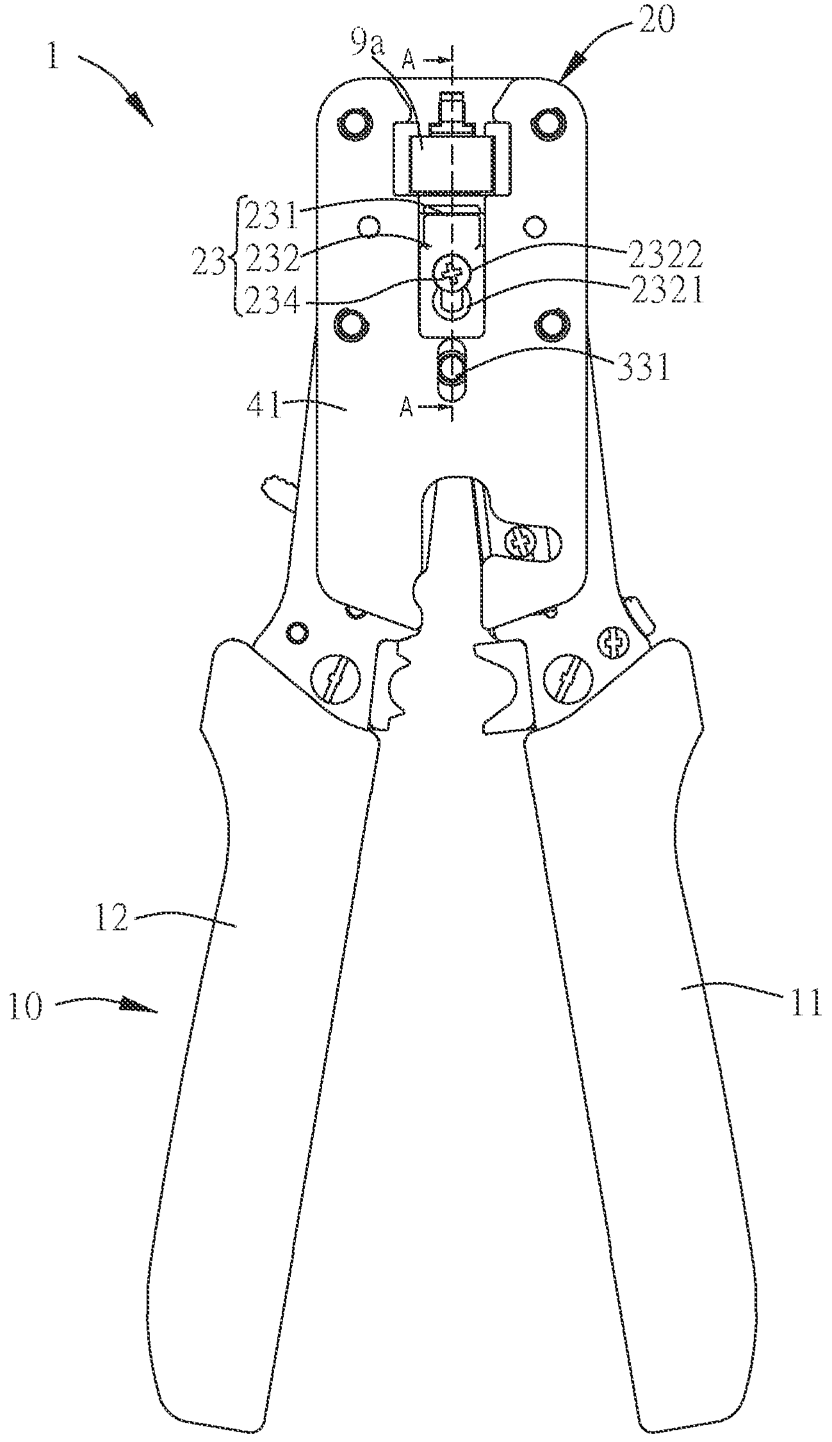
FIG. 7A illustrates a schematic drawing depicting the crimping plier as shown in FIG. 3A being used for crimping a telecommunications connector as shown in FIG. 2A.
Figure 7B:
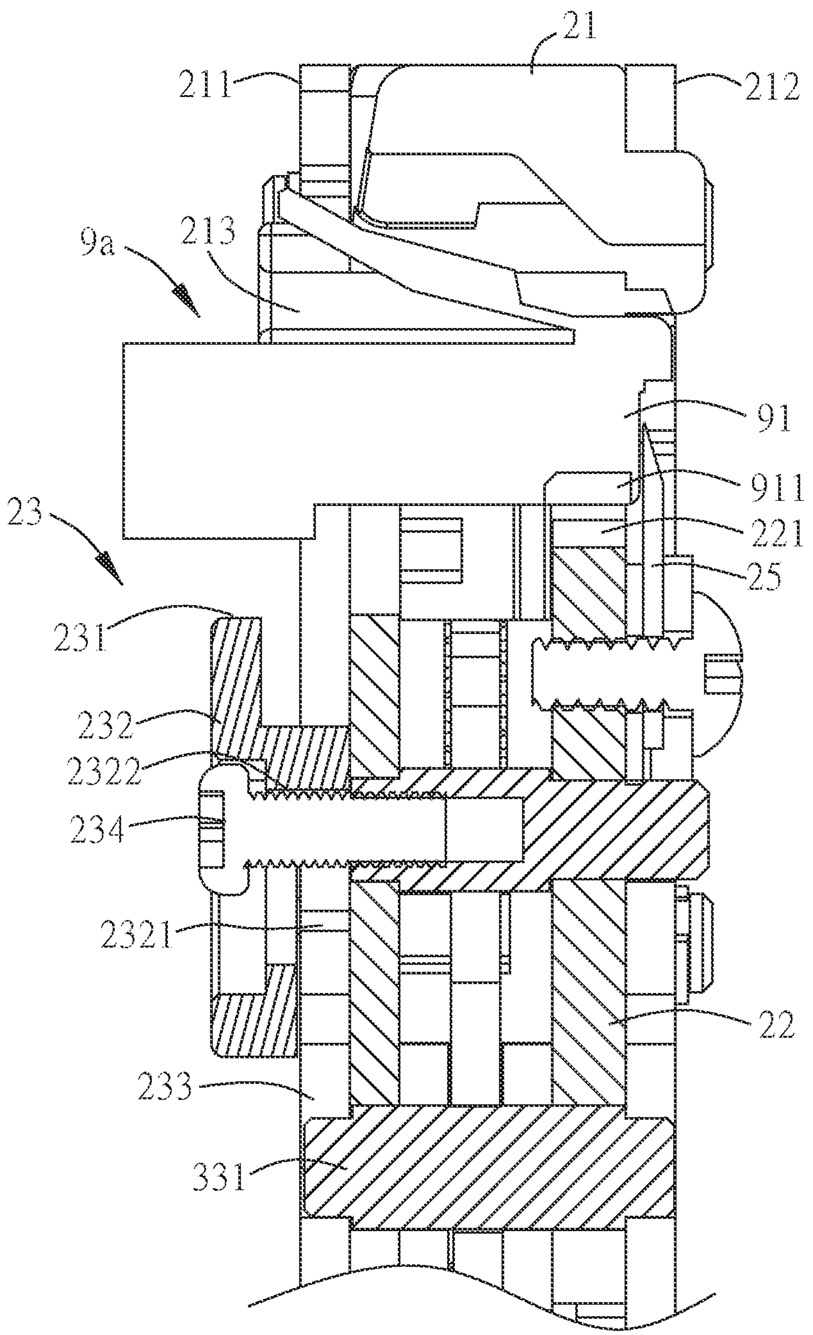
FIG. 7B illustrates a cross-sectional view of the crimping plier along the A-A side of FIG. 7A.

Please refer to FIG. 6A, FIG. 6B, FIG. 7A and FIG. 7B, wherein FIG. 6A illustrates a schematic drawing depicting the crimping plier as shown in FIG. 3A being used for crimping a telecommunications connector 9 as shown in FIG. 1; FIG. 6B illustrates a cross-sectional view of the crimping plier along the A-A side of FIG. 6A; FIG. 7A illustrates a schematic drawing depicting the crimping plier as shown in FIG. 3A being used for crimping a telecommunications connector 9*a* as shown in FIG. 2A; and FIG. 7B illustrates a cross-sectional view of the crimping plier along the A-A side of FIG. 7A. In this embodiment, the flat end 231 of the crimping member 23 can be positioned in a first position (as shown in FIG. 6A and FIG. 6B) or a second position (as shown in FIG. 7A and FIG. 7B) such that when the first clamp handle 11 and the second clamp handle 12 move toward each other (i.e. the crimping plier 1 is in a closed state), the flat end 231 of the crimping member 23 can selectively enter into the terminal accommodation portion 213. Specifically, when there is a need to crimp a telecommunications connector 9 with only a plastic housing, the flat end 231 of the crimping member 23 can be positioned in the first position (as shown in FIG. 6A and FIG. 6B) such that when the first clamp handle 11 and the second clamp handle 12 move toward each other, the flat end 231 of the crimping member 23 can enter into the terminal accommodation portion 213. When there is a need to crimp a telecommunications connector 9*a* with a metal housing 93, the flat end 231 of the crimping member 23 can be positioned in the second position (as shown in FIG. 7A and FIG. 7B) such that when the first clamp handle 11 and the second clamp handle 12 move toward each other, the flat end 231 of the crimping member 23 is located outside of the terminal accommodation portion 213.

Preferably, the crimping member 23 in this embodiment comprises a crimping block 232, a positioning plate 233 and a positioning pillar 234. The flat end 231 is located at the top end of the crimping block 232. The positioning pillar 234 may be, but is not limited to, a screw. The positioning pillar 234 passes through the crimping block 232 and is connected to the positioning plate 233. In other words, the crimping block 232 is disposed on the positioning plate 233 by the positioning pillar 234. The positioning plate 233 is connected to the first connecting rod 31 and the second connecting rod 32. In this embodiment, the positioning plate 233 is connected to the first connecting rod 31 and the second connecting rod 32 by the pivot portion 311 being connected to the support block 33, as shown in FIG. 4A and FIG. 5A.

Preferably, the crimping block 232 has a first positioning hole 2321 and a second positioning hole 2322, wherein the second positioning hole 2322 is located adjacent to the flat end 231. As shown in FIG. 6A and FIG. 7A, for example, the second positioning hole 2322 is located above the first positioning hole 2321. Therefore, when the positioning pillar 234 passes through the first positioning hole 2321 to connect the crimping block 231 with the positioning plate 233, the flat end 231 is positioned in the first position (as shown in FIG. 6A and FIG. 6B). In this embodiment, the position of the first positioning hole 2321 or the length of the crimping block 232 is not specifically limited. Only when the crimping plier 1 is in the closed state (i.e., the first clamp handle 11 and the second clamp handle 12 are close to each other) is the flat end 231 able to enter into the terminal accommodation portion 213 so that the crimping plier 1 can be used for crimping a connection terminal 91 having a strain latch 912.

More specifically, as shown in FIG. 1, the telecommunications connector 9 comprises a connection terminal 91 and a signal cable 92. The connection terminal 91 is made with a plastic housing, and has a plurality of conductive contact pins 911 and a strain latch 912. The signal cable 92 comprises a plurality of cores 921. The cores 921 are arranged in the front end of the connection terminal 91 and correspond to the conductive contact pins 911. The strain latch 912 is located in the rear end of the connection terminal 91. When the user needs to crimp the telecommunications connector 9, the user can first position the flat end 231 of the crimping member 23 in the first position, as shown in FIG. 6A and FIG. 6B. At this time, the length of the crimping block 232 above the positioning pillar 234 is longer. Next, the connection terminal 91 of the telecommunications connector 9 is placed in the terminal accommodation portion 213, the conductive contact pins 911 correspond to the tooth-shaped structure 221 of the crimping tooth member 22, and the strain latch 912 corresponds to the flat end 231 of the crimping member 23. Finally, a force is applied to the first clamp handle 11 and the second clamp handle 12 such that the first clamp handle 11 and the second clamp handle 12 move toward each other, and thus the first connecting rod 31 and the second connecting rod 32 can move upward to push the crimping tooth member 22 and the crimping member 23 (as shown in FIG. 5C). Because the crimping tooth member 22 is pushed upward, the tooth-shaped structure 221 can then enter into the terminal accommodation portion 213; as a result, the tooth-shaped structure 221 can then crimp the conductive contact pins 911 to the cores 921. As the crimping member 23 is pushed upward, the flat end 23 of the crimping member 23 will compress the strain latch 912 of the connection terminal 91 upward to cause it to be embedded into the cable jacket 922 of the signal cable 92, thereby securing the connection terminal 91 and the signal cable 92. Please note that the detailed structure of the telecommunications connector 9 can be seen in FIG. 1, whereas the telecommunications connector 9 illustrated in FIG. 6B is merely the housing of the connection terminal 91.

Further, when the positioning pillar 234 passes through the second positioning hole 2332, the flat end 231 of the crimping member 23 is positioned in the second position (as shown in FIG. 7A and FIG. 7B). Because the second positioning hole 2322 is located above the first positioning hole 2321, then when the positioning pillar 234 passes through the second positioning hole 2322 to connect the crimping block 231 with the positioning plate 233, the length of the crimping block 232 above the positioning pillar 234 is shorter. Therefore, when the crimping plier 1 is in the closed state (i.e., the first clamp handle 11 and the second clamp handle 12 are close to each other), the flat end 231 of the crimping member 23 is located outside of the terminal accommodation portion 213; therefore, the flat end 231 is located under the terminal accommodation portion 213. When the flat end 231 of the crimping member 23 is positioned in the second position, the crimping plier 1 is applicable for crimping a telecommunications connector **9*a* (as shown in FIG. 2A) having a metal housing 93. Please note that the detailed structure of the telecommunications connector 9*a* can be seen in FIG. 2A, whereas the telecommunications connector 9*a* illustrated in FIG. 7B is merely the housing of the connection terminal 91**.

Figure 2B:
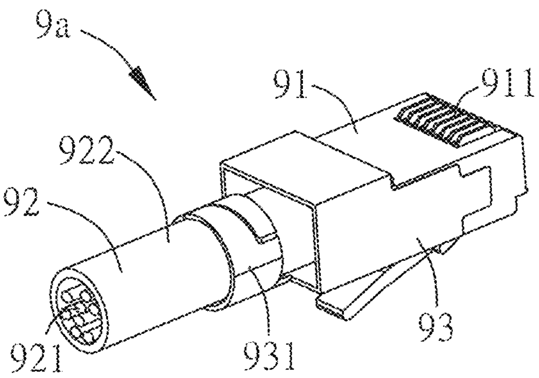
FIG. 2B (Prior Art)

Specifically, as shown in FIG. 2A and FIG. 2B, the telecommunications connector **9*a* comprises not only the connection terminal 91 and the signal cable 92 but also a metal housing 93. As shown in FIG. 2A the metal housing 93 is disposed on the outside of the connection terminal 91 such that the telecommunications connector 9*a* does not have the structure of a strain latch 912. Further, the metal housing 93 has two extension portions 931 located on the outside of the signal cable 92. When the user needs to crimp a telecommunications connector 9*a* having a metal housing 93, the user can first put the positioning pillar 234 through the second positioning hole 2322 located above the first positioning hole 2321, such that the flat end 231 of the crimping member 23 is positioned in the second position. Next, the connection terminal 91 of the telecommunications connector 9*a* is placed in the terminal accommodation portion 213, as shown in FIG. 7A and FIG. 7B. Similarly, the first clamp handle 11 and the second clamp handle 12 move toward each other in order to drive the first connecting rod 31 and the second connecting rod 32 to push the crimping tooth member 22 and the crimping member 23 upward. At this time, the tooth-shaped structure 221 of the crimping tooth member 22 enters into the terminal accommodation portion 213 so as to crimp the conductive contact pins 911 to the cores 921. Because the flat end 231 of the crimping member 23 is positioned in the second position, the flat end 231 is located on the outside of the terminal accommodation portion 213** at this moment.

Figure 8:
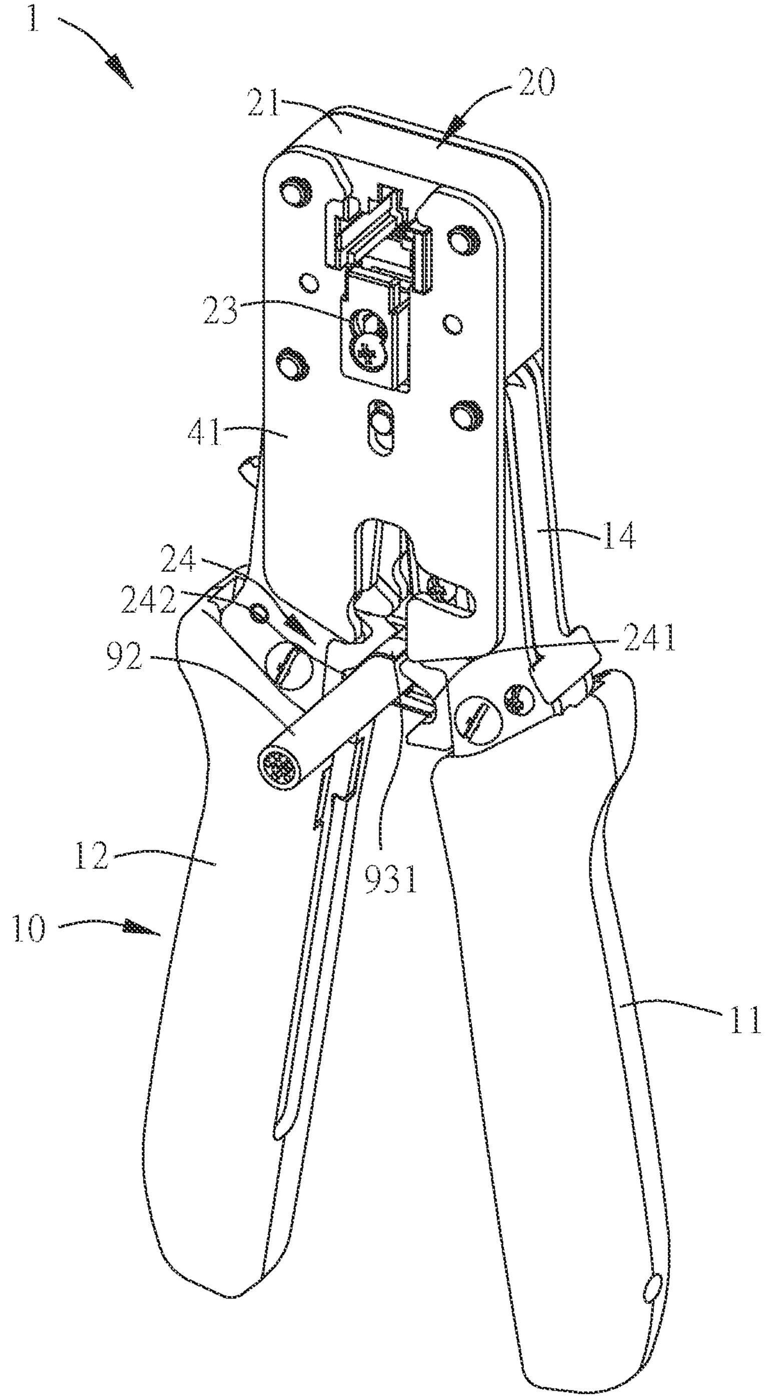
FIG. 8 illustrates a schematic drawing depicting the crimping plier as shown in FIG. 3A being used for securing a signal cable and a metal housing of a telecommunications connector as shown in FIG. 2A.

After the conductive contact pins 911 are crimped, the telecommunications connector **9*a* will then be moved to the clamp set 24, as shown in FIG. 8. FIG. 8 illustrates a schematic drawing depicting the crimping plier as shown in FIG. 3A being used for securing the signal cable 92 and the metal housing 93 of the telecommunications connector 9*a* as shown in FIG. 2A. The clamp set 24 is used for wrapping the extension portions 931 of the metal housing 93 around the cable jacket 922 of the signal cable 92 (see FIG. 2B for the completed look). As shown in FIG. 4A and FIG. 4B, the clamp set 24 in this embodiment comprises a first concave portion 241 and a second concave portion 242. The first concave portion 241 is disposed on the first clamp handle 11, and the second concave portion 242 is disposed on the second clamp handle 12. The user will put the signal cable 92 and the extension portions 931 of the metal housing 93 in the clamp set 24, and the extension portions 931 will be placed in either the first concave portion 241 or the second concave portion 242, as shown in FIG. 8. Then a force is applied to the first clamp handle 11 and the second clamp handle 12 to make the first clamp handle 11 and the second clamp handle 12 move toward each other. At this time, the first concave portion 241 and the second concave portion 242 will close to jointly form a circular structure (as shown in FIG. 5C), thereby bending the extension portions 931 to cause the extension portions 931 to wrap around the cable jacket 922 of the signal cable 92, and thus limning the telecommunications connector 9***a* as shown in FIG. 2B with the connection terminal 91 and the signal cable 92 secured.

Please refer to FIG. 3B and FIG. 4B. Preferably, the crimping mechanism 20 further comprises a first blade 25 disposed on the outside of the crimping tooth member 22. In this embodiment, the first blade 25 is disposed on the outside of the crimping tooth member 22 by a screw and is located within the opening 421 of the second side plate 42. The first blade 25 can be used for cutting away excess cores 921 protruding from the pass-through connection terminal 91. Specifically, the connection terminal 91 can be classified into two types: pass-through and non-pass-through. A pass-through connection terminal 91 comprises a plurality of openings in the front end of the connection terminal 91 such that the cores 921 can pass through the outside of the connection terminal 91, as shown in FIG. 1. A non-pass-through connection terminal comprises a closed front end without any openings. In this embodiment, a pass-through connection terminal 91 is used as an example for explanation purposes.

Because the size of the cores 921 of the signal cable 92 is small, it is difficult for the user to sort multiple cores 921 of the signal cable 92 in order and align them to the front end of the connection terminal 91. For the convenience of operations, most users will pull the cores 921 out from the pass-through connection terminal 91, as shown in FIG. 1. Conventionally, a utility knife is used to trim the cores 921 protruding from the connection terminal 91. In this embodiment, because the first blade 25 is disposed on the crimping tooth member 22, it can move along with the crimping tooth member 22. When the first clamp handle 11 and the second clamp handle 12 move toward each other, the first blade 25 can move toward the terminal accommodation portion 213 together with the crimping tooth member 22 (see FIG. 6B and FIG. 7B) so as to cut away the excess cores 921 protruding from the connection terminal 91.

Further, the user needs to strip off the cable jacket 922 of the signal cable 92 first so as to expose the cores 921 covered in the cable jacket 922. As shown in FIG. 4A, in this embodiment, the clamp handle mechanism 10 further comprises a second blade 13 disposed on the first clamp handle 11 on one side facing the second clamp handle 12. When the user needs to strip off the cable jacket 922 of the signal cable 92, the signal cable 92 can be placed between the first clamp handle 11 and the second clamp handle 12 and corresponding to the second blade 13. Next, a force is applied to the first clamp handle 11 and the second clamp handle 12 to cause the first clamp handle 11 and the second clamp handle 12 to move toward each other. At this time, the second blade 13 will contact (or cut into) the cable jacket 922 of the signal cable 92. The user can rotate the signal cable 92 to form a cutting mark around the cable jacket 922 so as to cut and remove the cable jacket 922. Preferably, the second clamp handle 12 further comprises a concave groove 124 (please refer to FIG. 9A and FIG. 9B first) for placing the signal cable 92 such that the signal cable 92 can rotate within the concave groove 124 to facilitate the user's operation.

Preferably, the second clamp handle 12 further comprises a wire cutting portion 125 (please refer to FIG. 9A and FIG. 9B first), which is a flat structure. The concave groove 124 is adjacent to the wire cutting portion 125, and the second blade 13 can correspond to both the concave groove 124 and the wire cutting portion 125. When the user needs to cut the signal cable 92, the signal cable 92 can be placed in the wire cutting portion 125. When the first clamp handle 11 and the second clamp handle 12 move toward each other, the second blade 25 can cut the signal cable 92 accordingly.

Figure 9A:
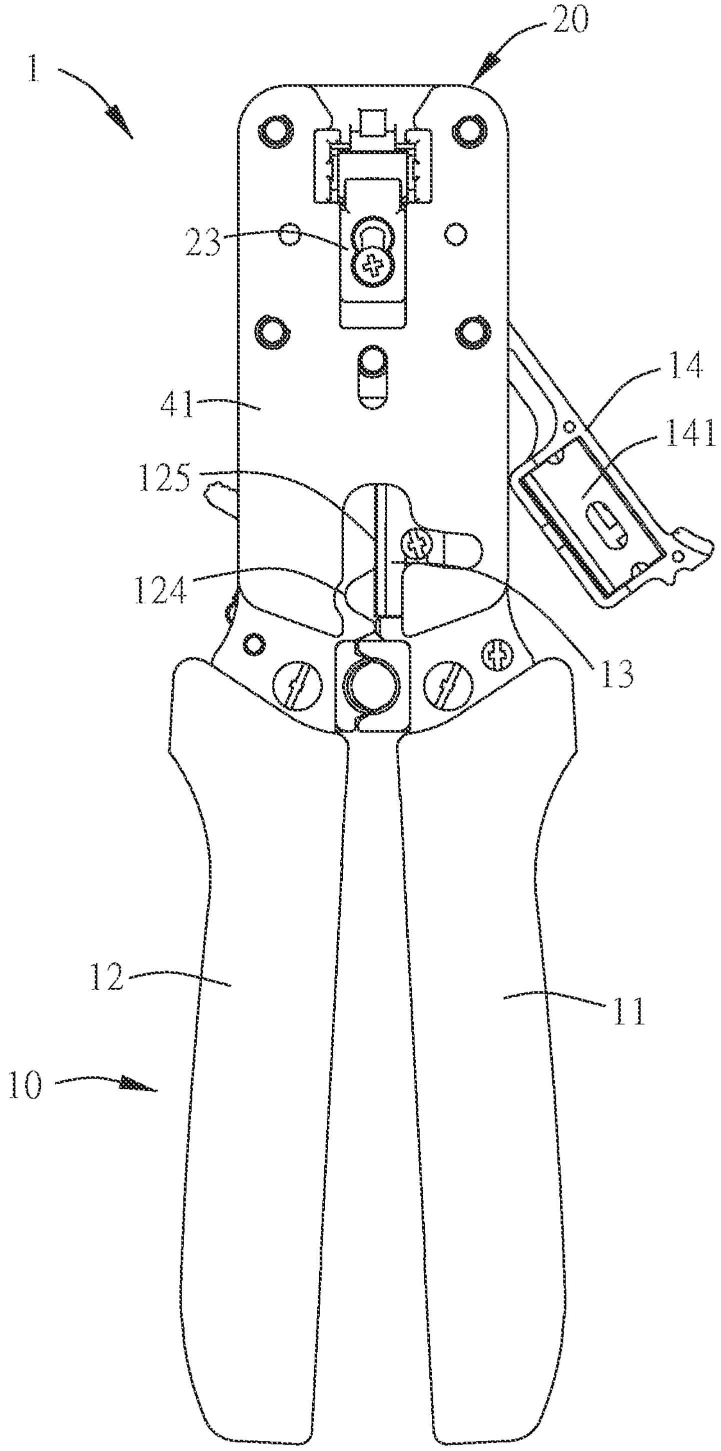
FIG. 9A and FIG. 9B illustrate schematic drawings depicting the storage element of the crimping plier as shown in FIG. 3A in an unfolded state.
Figure 9B:
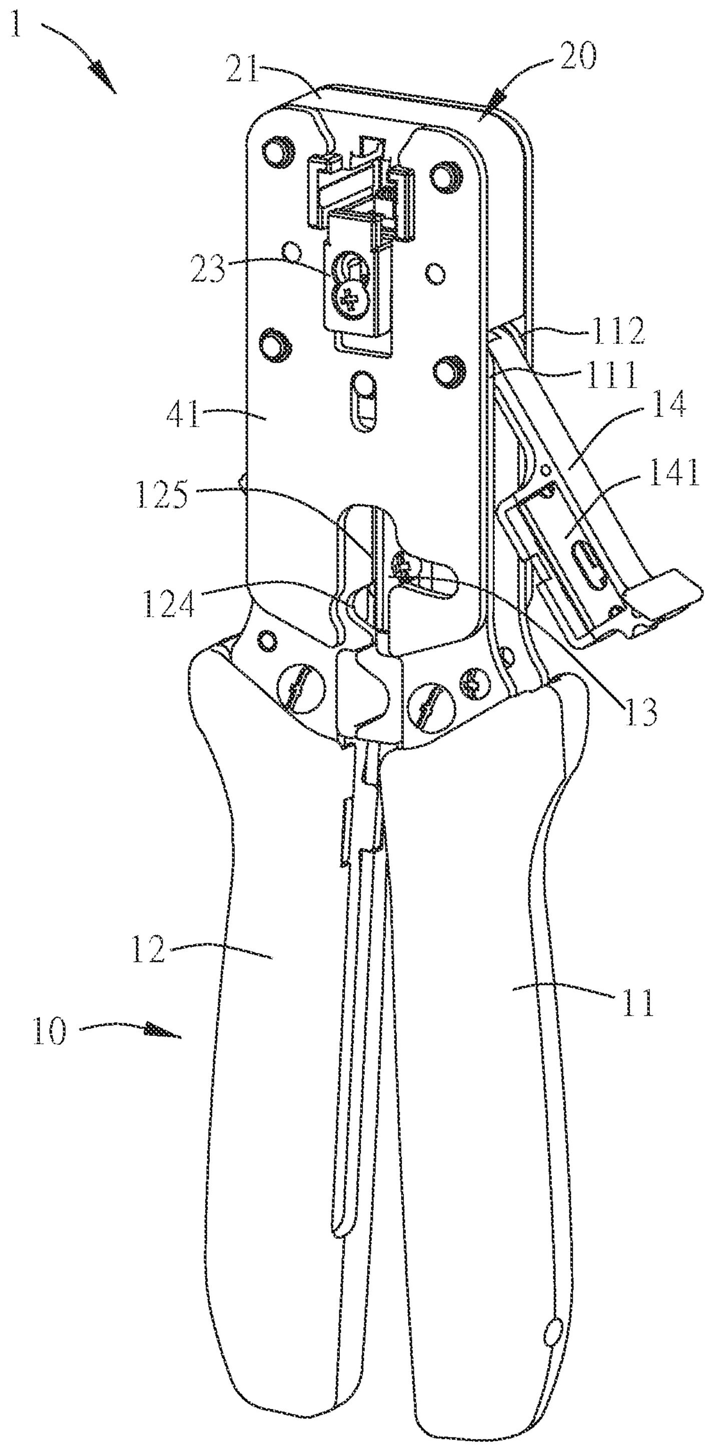

Please refer to FIG. 9A and FIG. 9B, wherein FIG. 9A and FIG. 9B illustrate schematic drawings depicting the storage element of the crimping plier as shown in FIG. 3A in an unfolded state. Preferably, the clamp handle mechanism 10 further comprises a storage element 14, which is disposed within the first clamp handle 11, such as in the space between the front plate body 111 and the back plate body 112. Moreover, the storage element comprises a storage groove 141 used for placing some spare parts. For example, the storage groove 141 can be used for placing replaceable blades. In this embodiment, the shape of the storage groove 141 is substantially identical to the shape of the second blade 13, so it can be used for storing replaceable second blades 13. Further, one end of the storage element 14 is pivoted to the front plate body 111 and the back plate body 112 of the first clamp handle 11 such that the storage element 14 can rotate relative to the first clamp handle 11. Generally, the storage element 14 and its storage groove 141 are located between the front plate body 111 and the back plate body 112 of the first clamp handle 11. When there is a need to replace the second blade 13, the user can pull out the storage element 14. At this time, the storage element 14 will rotate relative to the first clamp handle 11 such that the storage groove 141 moves to the outside of the first clamp handle 11, and therefore the user can select a new second blade 13. In other embodiments, the storage element 14 can also be disposed within the second clamp handle 12 without limiting the scope of the present disclosure.

According to the above description, the crimping plier of the present disclosure comprises a clamp handle mechanism, a crimping mechanism and a driving mechanism. The crimping mechanism comprises a crimping tooth member, a crimping member and a clamp set. Further, a flat end of the crimping member can be positioned in a first position or a second position such that when a first clamp handle and a second clamp handle move toward each other, the flat end of the crimping member can selectively enter into a terminal accommodation portion; therefore, the crimping plier of the present disclosure is applicable for different types of telecommunications connectors. More specifically, in the case of the flat end being positioned in the first position, when the first clamp handle and the second clamp handle move toward each other, the flat end of the crimping member can enter into the terminal accommodation portion so as to be applicable fir a telecommunications connector having only a plastic housing. In the case of the flat end being positioned in the second position, the flat end of the crimping member is located outside of the terminal accommodation portion when the first clamp handle and the second clamp handle move toward each other so as to be applicable for a telecommunications connector having a metal housing. Moreover, the clamp set can be used to wrap the extension portions of the metal housing around the cable jacket of the signal cable.

It is noted that the above-described embodiments are merely illustrative of preferred embodiments of the present disclosure, and that in order to prevent redundancy, not all possible combinations of the variations are described in detail; various changes and modifications may be made to the described embodiments without departing from the scope of the disclosure as described by the appended claims.

What is claimed is:

1. A crimping plier, used for crimping a telecommunications connector, the crimping plier comprising:
- a clamp handle mechanism, comprising a first clamp handle and a second clamp handle pivoted to each other;
- a crimping mechanism, comprising:
- a main body, disposed on a top end of the clamp handle mechanism, the main body having a terminal accommodation portion;
- a crimping tooth member, movably disposed on the main body, one end of the crimping tooth member having a tooth-shaped structure, the tooth-shaped structure corresponding to the terminal accommodation portion;
- a crimping member, movably disposed on the main body, the crimping member having a flat end, the flat end corresponding to the terminal accommodation portion and being positioned in a first position or a second position; and
- a clamp set, having a first concave portion and a second concave portion, the first concave portion being disposed on the first clamp handle and the second concave portion being disposed on the second clamp handle; and
- a driving mechanism, disposed between the first clamp handle and the second clamp handle, the driving mechanism comprising:
- a first connecting rod with one end connected to the first clamp handle and the other end connected to the crimping tooth member and the crimping member; and
- a second connecting rod with one end connected to the second clamp handle and the other end connected to the crimping tooth member and the crimping member;
- wherein when the first clamp handle and the second clamp handle move toward each other, the first connecting rod and the second connecting rod push the crimping tooth member and the crimping member such that the tooth-shaped structure of the crimping tooth member enters into the terminal accommodation portion, and the flat end of the crimping member selectively enters into the terminal accommodation portion such that the first concave portion and the second concave portion close to jointly form a circular structure,
- wherein when the flat end of the crimping member is positioned in the first position and the first clamp handle and the second clamp handle move toward each other, the flat end enters into the terminal accommodation portion, and
- when the flat end of the crimping member is positioned in the second position and the first clamp handle and the second clamp handle move toward each other, the flat end is located outside of the terminal accommodation portion.

2. The crimping plier as claimed in claim 1, wherein the main body comprises a first side face and a second side face opposite to each other, the crimping member is disposed on the first side face of the main body, and the crimping tooth member is disposed on the second side face of the main body.

3. The crimping plier as claimed in claim 1, wherein the driving mechanism further comprises a support block and at least one spring, the support block is connected to the first connecting rod and the second connecting rod, and one end of the spring is connected to the main body and the other end of the spring is connected to the support block; when the clamp handle mechanism receives a force, the first clamp handle and the second clamp handle move toward each other, and the first connecting rod and the second connecting rod push the support block to move toward the crimping mechanism and compress the spring.

4. The crimping plier as claimed in claim 3, wherein when the clamp handle mechanism releases the force, the support block is propelled away from the crimping mechanism by an elastic force from the spring, and the support block drives the first connecting rod and the second connecting rod such that the first clamp handle and the second clamp handle move away from each other.

5. The crimping plier as claimed in claim 3, wherein the support block has a pivot portion, where the first connecting rod, the second connecting rod, the crimping tooth member and the crimping member are connected to the pivot portion.

6. The crimping plier as claimed in claim 1, wherein the crimping member comprises a crimping block, a positioning plate and a positioning pillar, where the flat end is located at the crimping block, the positioning pillar passes through the crimping block and is connected to the positioning plate, and the positioning plate is connected to the first connecting rod and the second connecting rod.

7. The crimping plier as claimed in claim 6, wherein the crimping block has a first positioning hole and a second positioning hole, and the second positioning hole is located adjacent to the flat end; when the positioning pillar passes through the first positioning hole, the flat end is positioned in the first position, and when the positioning pillar passes through the second positioning hole, the flat end is positioned in the second position.

8. The crimping plier as claimed in claim 1, wherein the crimping mechanism further comprises a first blade disposed on the outside of the crimping tooth member; when the first clamp handle and the second clamp handle move toward each other, the first blade moves toward the terminal accommodation portion.

9. The crimping plier as claimed in claim 1, wherein the clamp handle mechanism further comprises a storage element disposed within the first clamp handle, and one end of the storage element is pivoted to the first clamp handle.

10. The crimping plier as claimed in claim 9, wherein the storage element comprises a storage groove, and the storage element rotates relative to the first clamp handle such that the storage groove moves to the outside of the first clamp handle.

11. The crimping plier as claimed in claim 1, wherein the driving mechanism further comprises a ratchet and a stopper, the ratchet is disposed on the second clamp handle and has a protrusion, one end of the stopper is connected to the first clamp handle, the stopper has a plurality of tooth portions, and the protrusion engages with one of the tooth portions.

12. The crimping plier as claimed in claim 11, wherein when the first clamp handle and the second clamp handle move toward each other, the protrusion of the ratchet engages with another one of the tooth portions.

13. The crimping plier as claimed in claim 1, wherein the crimping mechanism further comprises a second blade disposed on the first clamp handle on one side facing the second clamp handle.

14. The crimping plier as claimed in claim 13, wherein the second clamp handle comprises a concave groove and a wire cutting portion, the concave groove is adjacent to the wire cutting portion, and the second blade corresponds to the concave groove and the wire cutting portion.

* * * * *